United States Patent [19]
Pawlowski et al.

[11] Patent Number: 5,911,053
[45] Date of Patent: *Jun. 8, 1999

[54] METHOD AND APPARATUS FOR CHANGING DATA TRANSFER WIDTHS IN A COMPUTER SYSTEM

[75] Inventors: Stephen S. Pawlowski, Beaverton; Peter D. MacWilliams, Aloha; Gurbir Singh, Portland, all of Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/723,572

[22] Filed: Sep. 30, 1996

[51] Int. Cl.⁶ .................................................. G06F 3/00
[52] U.S. Cl. ........................................... 395/307; 395/306
[58] Field of Search ..................... 395/306, 307

[56] References Cited

U.S. PATENT DOCUMENTS

| | | | |
|---|---|---|---|
| 4,633,437 | 12/1986 | Mothersole et al. | 395/306 |
| 5,274,763 | 12/1993 | Banks . | |
| 5,300,811 | 4/1994 | Suzuki et al. | 257/691 |
| 5,446,845 | 8/1995 | Arroyo et al. | 395/280 |
| 5,537,659 | 7/1996 | Nakao | 395/307 |
| 5,548,766 | 8/1996 | Kaneko et al. | 395/775 |
| 5,613,078 | 3/1997 | Kishigami | 395/306 |

OTHER PUBLICATIONS

Popescu, Val, Merle Schultz, John Spracklen, Gary Gibson, Bruce Lightner and David Isaman, "The Metaflow Architecture", IEEE Micro, Jun. 1991, pp. 10–13 and 63–73.

*Intel 486™ Microprocessor Family,* Intel Corporation, Sep. 1994, pp. 31, 146, 167–171, & 186–187.

Microprocessors: Vol. 1—Intel 386™, 80286 & 8086 Microprocessors, Intel Corporation, 1994, pp. 1–63 –1–64, 1–68 –1–69, 1–84 –1–86.

*Primary Examiner*—Ayaz R. Sheikh
*Assistant Examiner*—David A. Wiley
*Attorney, Agent, or Firm*—Blakely, Sokoloff, Taylor & Zafman LLP

[57] ABSTRACT

In a method and apparatus for changing data transfer widths in a computer system, a first agent on a bus provides a first indication to a second agent on the bus identifying one or more data transfer widths supported by the first agent. The second agent then provides a second indication to the first agent identifying one or more data transfer widths supported by the second agent. A data transfer width is then determined based on the first indication and the second indication. According to an embodiment of the present invention, a third agent involved in a transaction is also able to provide a third indication to the first and/or second agents identifying one or more data transfer widths supported by the third agent. The data transfer width(s) is then determined based on the first, second, and third indications.

14 Claims, 8 Drawing Sheets

METHOD AND APPARATUS FOR CHANGING DATA TRANSFER WIDTHS IN A COMPUTER SYSTEM

BACKGROUND OF THE INVENTION

1. Field of the invention

The present invention pertains to computer systems and computer system buses. More particularly, this invention relates to changing of data transfer widths over a bus in a computer system.

2. Background

Modern computer systems typically have multiple agents coupled together via a system bus. Typically, the agents are integrated circuit chips with multiple pins coupling each agent to the bus. These agents may include, for example, processors, memory devices, mass storage devices, etc. In order for the computer system to operate properly, these agents should be able to effectively communicate with each other via the bus.

The bus includes multiple data lines, each of which is capable of transferring one bit of data. The number of clock cycles that a bit of data is required to be on the data line in order to be received by another agent is dependent on the bus protocol, but typically ranges from one to a few clock cycles. The total number of data lines in a bus is referred to as the data bus width.

A wide variety of agents for use in computer systems are commonly available. These different agents have a varying number of data pins which are used to connect the agents to the bus. The number of such data pins used by a particular agent is referred to as the data width supported by that agent. There are numerous reasons for using different data widths. For example, some agents may not need to operate internally with as wide a data path as the bus supports. By way of another example, some agents may want to conserve cost, pin count, and/or chip size. Situations can arise where it would be beneficial to place multiple agents on a bus, each of which connects to the bus using a different data width. Therefore, it would be beneficial to provide a mechanism to allow multiple agents to reside on the same bus and communicate effectively with one another despite their supporting different data widths.

One solution would be to limit all data transfers on the bus to the smallest maximum data width supported by any agent coupled to the bus. For example, if four agents were coupled to the bus, three of which support up to 64-bit transfers and one of which supports only up to 32-bit transfers, then all data transfers on the bus would be limited to 32 bits. However, this solution results in inefficient data transfers between agents capable of supporting 64-bit transactions. Therefore, it would be beneficial to provide dynamic support for different data widths on a transaction by transaction basis, accounting for the data widths supported by the agents in each transaction. Doing so allows two or more agents involved in a transaction to transfer data at the maximum width supported by those agents, rather than limiting the transaction to the smaller data size of another agent on the bus which is not involved in this transaction.

As will be described in more detail below, the present invention provides a method and apparatus for changing data transfer widths in a computer system to achieve these and other desired results which will be apparent to those skilled in the art from the description that follows.

SUMMARY OF THE INVENTION

A method and apparatus for changing data transfer widths in a computer system is described herein. A first agent on a bus provides a first indication to a second agent on the bus identifying one or more data transfer widths supported by the first agent. The second agent then provides a second indication to the first agent identifying one or more data transfer widths supported by the second agent. A data transfer width is then determined based on the first indication and the second indication.

According to an embodiment of the present invention, a third agent involved in a transaction is also able to provide a third indication to the first and/or second agents identifying one or more data transfer widths supported by the third agent. The data transfer width(s) is then determined based on the first, second, and third indications.

According to an embodiment of the present invention, the data transfer is all part of the same bus transaction regardless of the width of the data transfer. Thus, in this embodiment, the transaction is extended for additional clock cycles to accommodate the data transfer, rather than separating the transaction into multiple transactions.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

In the discussions to follow, certain signals are discussed followed by a "#". This notation is used to indicate a signal which is active when in a low state (that is, a low voltage). It is to be appreciated, however, that the present invention may be implemented where these signals are active when in a high state rather than when in a low state. Similarly, the present invention may be implemented where signals discussed herein which are not followed by a "#" are active when in a low state.

The present invention provides a mechanism for selecting a data transfer width on a bus on a transaction by transaction basis. An agent initiating a transaction on the bus which includes a data transfer provides an indication to the other agents on the bus of the data transfer width(s) supported by the agent. Additionally, each other agent(s) involved in the transaction also provides an indication of the data transfer width(s) supported by that agent. A particular data transfer width supported by all agents involved in the transaction is selected as the data transfer width which will be used for the data transfer.

Figure 1:
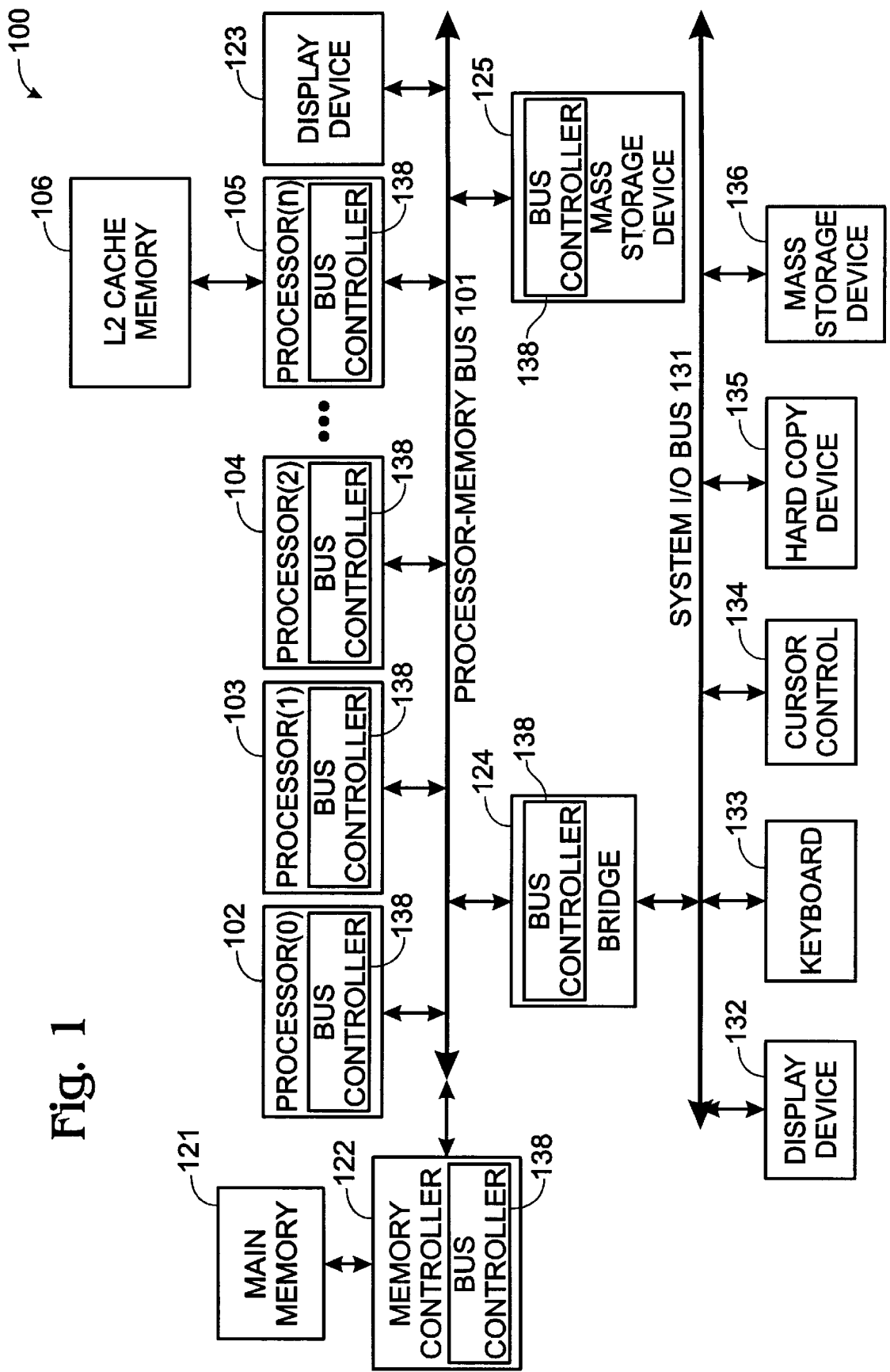
FIG. 1 illustrates a multiprocessor computer system such as may be used with one embodiment of the present invention.

FIG. 1 illustrates a multiprocessor computer system such as may be used with one embodiment of the present invention. The computer system 100 generally comprises a processor-memory bus or other communication means 101 for communicating information between different agents coupled to the bus 101, such as processors, bus bridges, memory devices, peripheral devices, etc. The processor-memory bus 101 includes arbitration, address, data and control buses (not shown). In one embodiment, each of the one or more processors 102, 103, 104, and 105 includes a small, extremely ast internal cache memory (not shown), commonly referred to as a level one (L1) cache memory for temporarily storing data and instructions on-chip. In addition, a bigger level two (L2) cache memory 106 can be coupled to any one of the processors, such as processor 105, for temporarily storing data and instructions for use by the processor(s). Each processor may have its own L2 cache, or some may share an L2 cache.

Processors 102, 103, and 104 may each be a parallel processor (a symmetric co-processor), such as a processor similar to or the same as processor 105. Alternatively, processor 102, 103, or 104 may be an asymmetric co-processor, such as a digital signal processor. In addition, processors 102 through 105 may include processors of different types. In one embodiment, the present invention includes Intel® Architecture microprocessors as processors 102 through 105, such as an i386™ microprocessor, an i486™ microprocessor, a Pentium® microprocessor, or a Pentium® Pro microprocessor. However, the present invention may utilize any type of microprocessor architecture. It is to be appreciated that the particular architecture(s) used is not especially germane to the present invention.

The processor-memory bus 101 provides system access to the memory and input/output (I/O) subsystems. A memory controller 122 is coupled to the processor-memory bus 101 for controlling access to a random access memory (RAM) or other dynamic storage device 121 (commonly referred to as a main memory) for storing information and instructions for processors 102 through 105. A mass data storage device 125, such as a magnetic disk and disk drive, for storing information and instructions, and a display device 123, such as a cathode ray tube (CRT), liquid crystal display (LCD), etc., for displaying information to the computer user may be coupled to the processor-memory bus 101.

Each agent coupled to the bus 101 includes a bus controller 138. Each bus controller is identical to bus controllers within each other agent or, at least, is configured to perform a minimum set of identical functions of the bus controllers of every other agent. The bus 101 and the various bus controllers within each bus agent collectively provide a pipelined bus system, wherein multiple bus transactions are processed simultaneously.

An input/output (I/O) bridge 124 may be coupled to the processor-memory bus 101 and a system I/O bus 131 to provide a communication path or gateway for devices on either processor-memory bus 101 or I/O bus 131 to access or transfer data between devices on the other bus. Essentially, the bridge 124 is an interface between the system I/O bus 131 and the processor-memory bus 101.

The I/O bus 131 communicates information between peripheral devices in the computer system. Devices that may be coupled to the system bus 131 include, for example, a display device 132, such as a cathode ray tube, liquid crystal display, etc., an alphanumeric input device 133 including alphanumeric and other keys, etc., for communicating information and command selections to other devices in the computer system (e.g., the processor 102) and a cursor control device 134 for controlling cursor movement. Moreover, a hard copy device 135, such as a plotter or printer, for providing a visual representation of the computer images and a mass storage device 136, such as a magnetic disk and disk drive, for storing information and instructions may also be coupled to the system bus 131.

In certain implementations of the present invention, additional processors or other components may be included. Additionally, in certain implementations components may be re-arranged. For example, the L2 cache memory 106 may lie between the processor 105 and the processor-memory bus 101. Furthermore, certain implementations of the present invention may not require nor include all of the above components. For example, the processors 102 through 104, the display device 123, or the mass storage device 125 may not be coupled to the processor-memory bus 101. Additionally, the peripheral devices shown coupled to the system I/O bus 131 may be coupled to the processor-memory bus 101; in addition, in some implementations only a single bus may exist with the processors 102 through 105, the memory controller 122, and the peripheral devices 132 through 136 coupled to the single bus.

Figure 2:
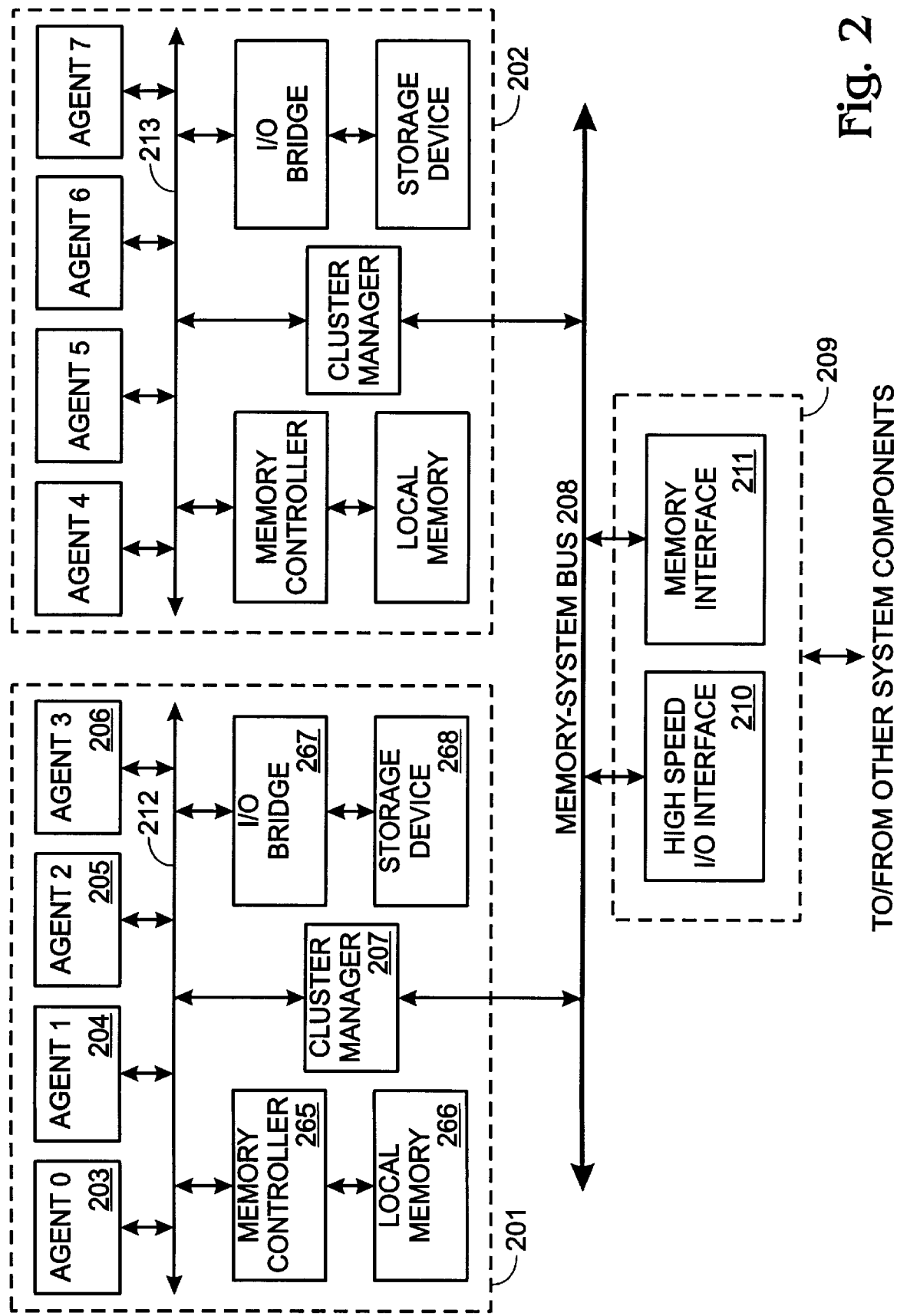
FIG. 2 is a block diagram illustrating a bus cluster system such as may be used with one embodiment of the present invention.

FIG. 2 is a block diagram illustrating a bus cluster system such as may be used with one embodiment of the present invention. FIG. 2 shows two clusters 201 and 202 of agents. Each of these clusters is comprised of a number of agents. For example, the cluster 201 is comprised of four agents 203–206 and a cluster manager 207, which may include another cache memory (not shown), coupled to the bus 212. The agents 203–206 can include microprocessors, co-processors, digital signal processors, etc.; for example, the agents 203 through 206 may be the same as the processor 105 shown in FIG. 1. The cluster manager 207 and its cache are shared between these four agents 203–206. Each cluster is coupled to a memory-system bus 208. These clusters 201 and 202 are coupled to various other components of the computer system through a system interface 209. The system interface 209 includes a high speed I/O interface 210 for interfacing the computer system to peripheral devices (not shown) and a memory interface 211 which provides access to a global main memory (not shown), such as a DRAM memory array. In one embodiment, the high speed I/O interface 210 is the bridge 124 of FIG. 1, and the memory interface 211 is the memory controller 122 of FIG. 1.

In one embodiment of the present invention, each cluster also includes a local memory controller and/or a local I/O bridge. For example, the cluster 201 may include a local memory controller 265 coupled to the processor bus 212. The local memory controller 265 manages accesses to a RAM or other local memory 266 contained within the cluster 201. The cluster 201 may also include a local I/O bridge 267 coupled to the processor bus 212. Local I/O bridge 267 manages accesses to I/O devices within the cluster, such as a mass storage device 268, or to an I/O bus, such as system 1/O bus 131 of FIG. 1.

In another embodiment of the present invention, the local memory of each cluster is part of the memory and I/O space of the entire system, and is collectively referred to as the global memory and I/O space. Therefore, in this embodiment the system interface 209 need not be present because the individual local memory and I/O bridges can make up the global memory system.

In one embodiment of the present invention, the buses 212 and 213 and the memory-system bus 208 operate analogous to the processor-memory bus 101 of FIG. 1.

Certain implementations of the present invention may not require nor include all of the above components. For example, the cluster 201 or 202 may comprise fewer than four agents. Alternatively, the cluster 201 or 202 may not include the memory controller, local memory, I/O bridge, and storage device. Additionally, certain implementations of the present invention may include additional processors or other components.

In one embodiment of the present invention, bus transactions occur on the processor-memory buses described above in FIGS. 1 and 2 in a pipelined manner. That is, multiple bus transactions may be pending at the same time, wherein each is not fully completed. Therefore, when a requesting agent begins a bus transaction by driving an address onto the address bus, the bus transaction may be only one of a number of bus transactions currently pending. Although bus transactions are pipelined, the bus transactions do not have to be fully completed in order; completion replies to requests can be out-of-order.

In the bus used with one embodiment of the present invention, bus activity is hierarchically organized into operations, transactions, and phases. An operation is a bus procedure that appears atomic to software such as reading a naturally aligned memory location. Executing an operation usually requires one transaction but may require multiple transactions, such as in the case of deferred replies in which requests and replies are different transactions, or in unaligned memory operations which software expects to be atomic. In this embodiment, a transaction is the set of bus activities related to a single request, from request bus arbitration through the completion of the transaction (e.g., a normal or implicit writeback response) during the Response Phase.

In one embodiment, a transaction contains up to six distinct phases. However, certain phases are optional based on the transaction and response type. Alternatively, additional phases could also be added. A phase uses a particular signal group to communicate a particular type of information. In one implementation, these phases are:

Arbitration Phase
Request Phase
Error Phase
Snoop Phase
Response Phase
Data Transfer Phase In one mode, the data transfer phase is optional and is used if a transaction is transferring data. The data phase is request-initiated if the data is available at the time of initiating the request (for example, for a write transaction). The data phase is response-initiated if the data is available at the time of generating the transaction response (for example, for a read transaction). A transaction may contain both a request-initiated data transfer and a response-initiated data transfer.

Figure 3:
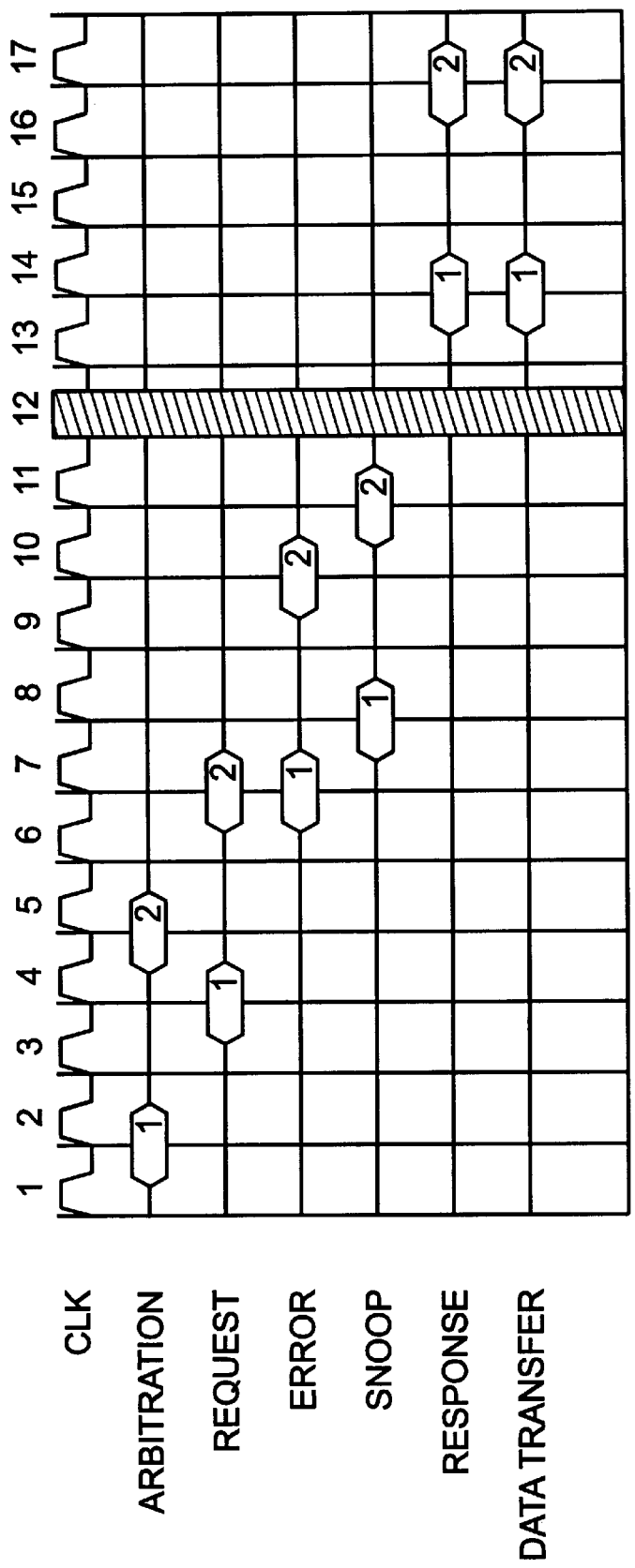
FIG. 3 shows an example of overlapped phases for two transactions according to one embodiment of the present invention.

Different phases from different transactions can overlap, thereby pipelining bus usage and improving bus performance. FIG. 3 shows an example of overlapped phases for two transactions. Referring to FIG. 3, transactions begin with an arbitration phase, in which a requesting agent becomes the bus owner. The arbitration phase needs to occur only if the agent that is driving the next transaction does not already own the bus. In one implementation, bus ownership is granted to the requesting agent in the arbitration phase two or more clocks after ownership is requested.

The second phase is the request phase, in which the bus owner drives a request and address information on the bus. In one implementation, the request phase is one or more clocks after bus ownership is granted (provided there is an arbitration phase), and is two clocks long. In the first clock, an address signal is driven along with the transaction type and sufficient information to begin snooping a memory access. In the second clock, byte enables used to identify which bytes of data should be transferred if the data transfer is less than the data bus width, a transaction identifier used to uniquely identify the transaction in the event a deferred response is to be given to the request, and the requested data transfer length are driven, along with other transaction information.

The third phase of a transaction is an error phase. The error phase indicates any immediate errors, such as parity errors, triggered by the request. If an error is discovered, an error signal is asserted during the error phase by the agent which detected the error in the transaction. According to one embodiment, when an error is indicated, the transaction is immediately dropped (that is, the transaction progresses no further in the pipeline) and may be re-driven by the agent which issued the transaction. Whether the agent re-issues the transaction depends on the agent itself. In one implementation, the error phase is three clocks after the request phase.

In one embodiment, every transaction that is not canceled because of an error in the error phase has a snoop phase. The snoop phase indicates if the cache line accessed in a transaction is not valid, valid or modified (dirty) in any agent's cache. In one implementation, the snoop phase is four or more clocks from the request phase.

The snoop phase of the bus defines a snoop window during which snoop events can occur on the bus. A snoop event refers to agents transmitting and/or receiving snoop results via the bus. An agent which has snoop results which need to be driven during the snoop phase drives these snoop results as a snoop event during the snoop window. All snooping agents coupled to the bus, including the agent driving the results, receive these snoop results as a snoop event during the snoop window. In one implementation, the snoop window is a single bus clock.

The response phase indicates whether the transaction failed or succeeded, whether the response is immediate or deferred, whether the transaction will be retried, or whether the transaction includes data phases. If a transaction contains a response-initiated data phase, then it enters the data transfer phase along with the response phase.

If the transaction does not have a data phase, then that transaction is complete after the response phase. If the requesting agent has write data to transfer or has requested read data, the transaction has a data phase which may extend beyond the response phase in the former case and will be coincident with or extend beyond the response phase in the latter case. The data phase occurs only if a transaction requires a data transfer. The data phase can be response initiated (for example, by the memory controller or another processor) or request initiated.

The bus accommodates deferred transactions by splitting a bus transaction into two independent transactions. The first transaction involves a request by a requesting agent and a response by the responding agent. The response includes the sending of the requested data (or completion signals) if the responding agent is ready to respond. In this case, the bus transaction ends. However, if the responding agent is not ready to complete the bus transaction, then the responding agent may send a deferred response over the bus during the response phase. Sending of a deferred response allows other transactions to be issued and not be held up by the completion of this transaction. When the responding agent is ready to complete the deferred bus transaction, the responding agent arbitrates for ownership of the bus and sends a deferred reply transaction which includes the requested data (or completion signals) on the bus.

It is to be appreciated that, due to the pipelined nature of the bus, multiple transactions can be at different stages of the bus at different times. For example, one transaction can be in the snoop phase, while a second transaction is in the error phase, and yet a third transaction can be in the request phase. Thus, error signals and request signals can both be issued concurrently on the bus even though they correspond to different transactions.

In one embodiment of the present invention, up to eight transactions can be outstanding on the bus at any particular time and up to sixteen transactions can be waiting for a deferred response at any particular time.

Additionally, one embodiment of the present invention also supports an implicit writeback, which is part of a read or write transaction. An implicit writeback occurs when a requesting agent places a request on the bus for a cache line which is stored in a modified state in a cache coupled to the bus. For example, an agent may perform a write transaction over the bus of eight bytes of data (or another amount of data less than or equal to a cache line), however the cache line which includes those eight bytes is stored in modified state in another agent's cache. In this situation, the cache which contains the cache line in modified state (or the agent which is coupled to the cache) issues a hit modified signal on the bus during the snoop phase for the transaction. The requesting agent places the eight bytes of write data onto the bus, which are retrieved by the targeted agent. Then, in the data transfer phase of the transaction, the cache which contains the cache line in modified state writes the cache line, which is 32 bytes in one implementation, to the bus. Any of the data in the cache line which was not written to by the requesting agent is then merged with the write data from the original data transfer.

An implicit writeback may also occur with a read transaction. For example, a requesting agent may perform a read request which targets a memory controller on the bus but which also hits a modified cache line in a snooping agent's cache memory. In this example, the snooping agent becomes the source agent and provides, as an implicit writeback, the requested data to the memory controller, which in turn stores the writeback data into main memory. Also in this example, the requesting agent takes the implicit writeback data from the bus (referred to as "snarfing" the data). In alternate embodiments, however, the memory controller may perform the snarfing, in which case the cache line will be taken off the bus by the requesting agent and may or may not be taken off the bus by the memory controller.

In one embodiment of the present invention, multiple agents can participate in a transaction. In one implementation, an agent which "participates" in a transaction is an agent which requests data, provides data, or receives data in the transaction. By way of example, a transaction may include a requesting agent (e.g., a processor) which issues a read or write request to a target agent (e.g., a memory controller), which returns or accepts the data to or from the requesting agent. By way of another example, a transaction may include a requesting agent (e.g., a processor) which issues a write request to a target agent (e.g., a memory controller), and also include a snooping agent which has the cache line corresponding to the write request in its cache in a modified state. In this example, the requesting agent issues the write data, the snooping agent writes back the entire cache line to the target agent, and the target agent accepts both the write data and the writeback data. By way of another example, a transaction may include a requesting agent (e.g., a processor) which issues a read request to a target agent (e.g., a memory controller), and also include a snooping agent which has the cache line corresponding to the read request in its cache in a modified state. In this example, the snooping agent writes back the cache line to the requesting agent, and both the requesting agent and the target agent accept the writeback data.

Figure 4:
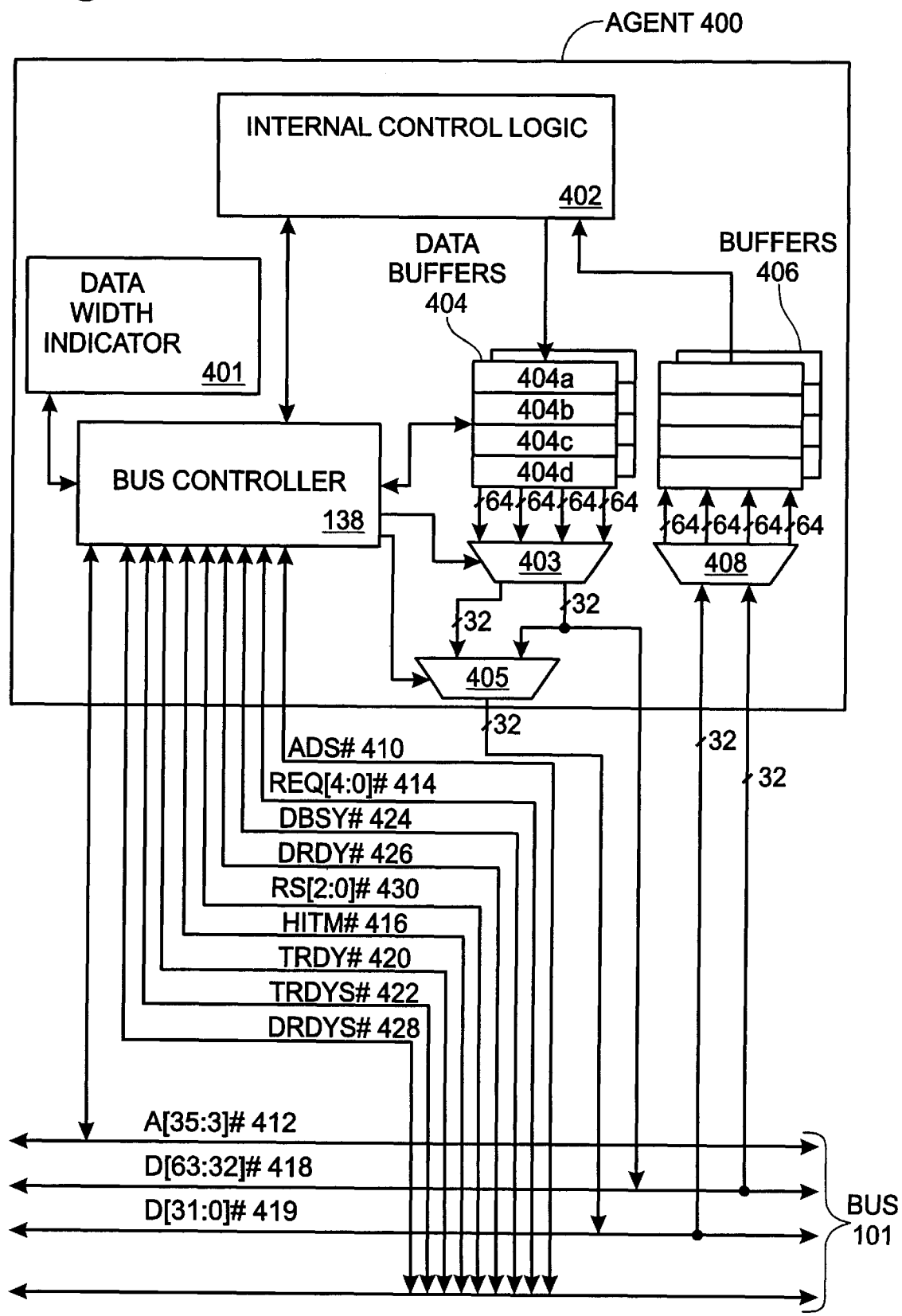
FIG. 4 is a block diagram illustrating an agent in more detail according to one embodiment of the present invention.

FIG. 4 is a block diagram illustrating an agent in more detail according to one embodiment of the present invention. As illustrated, the agent 400 includes a data width indicator 401, an internal control logic 402, bus controller 138, data buffers 404 and 406, and multiplexers 403, 405, and 408.

Data width indicator 401 is an indicator of the data transfer widths supported by the agent 400. In one implementation, the data width indicator 401 is a two-bit value which encodes the data transfer width supported by the agent 400. According to one embodiment of the present invention, data width indicator 401 is a preconfigured value. The indicator 401 can be preconfigured in any of a wide range of conventional manners, such as having particular pins of the agent 400 strapped to particular predetermined voltage levels which are sampled at system reset. It is to be appreciated that the data width indicator may also be re-configurable. For example, the data width indicator 401 may be stored in a flash memory device, or may be part of a configuration register which can be written to by software.

The bus controller 138 provides an interface between the agent 400 and the bus 101. The bus controller 138 transfers various control and address signals between the bus 101, and also controls the transfer of data to and from the bus 101. In the illustrated embodiment, the bus 101 is shown as having a 64-bit wide data bus, capable of supporting data transfer widths of up to 64 bits. However, it is to be appreciated that the other data bus widths may be used in alternate embodiments.

A summary of the signals used with the present invention is shown in Table I below. The interaction of these signals is discussed in more detail below. It is to be appreciated that additional signals are also transferred between the agent 400 and the bus 101, however these additional signals are not particularly germane to the present invention.

TABLE I

| Signal | Description |
| --- | --- |
| CLK | The bus clock. |
| ADS# | Address Strobe. Asserted by the requesting agent to indicate the beginning of the Request Phase for a transaction. |
| A[35:3]# | Address. The bus lines used to transfer the address for a request. |
| REQ[4:0]# | Request. Used to encode the particular request of the requesting agent, including the type of request (e.g., read, write, etc.) and length of the transfer |
| REQb[4:3]# | Data size. Two of the REQ[4:0]# bits. Used by the requesting agent to encode the data transfer widths supported by the requesting agent. The "b" indicates the signals are driven in the second clock cycle of the Request Phase. |
| HITM# | Modified Hit. Asserted by a snooping agent to indicate that the request hits a modified cache line of the agent's cache. |
| DBSY# | Data Bus Busy. Asserted by the agent transferring data to indicate it is using or is about to use the data bus. |
| D[63:0]# | Data. The bus lines used to transfer the data (that is, the data bus). |
| DRDY#, DRDYS# | Data Ready. Asserted by the agent transferring data to indicate both that valid data is on the bus and the data size supported by the transferring agent. |
| TRDY#, TRDYS# | Target Ready. Asserted by the agent which is receiving data to indicate both that the agent is ready to accept the data and the data size supported by the receiving agent. |
| RS[2:0]# | Response Status. Asserted by the targeted agent to indicate the status of the response (e.g., Retry Response, Deferred Response, Failure, Implicit Writeback Response, or Normal Data Response). |

FIG. 4 also illustrates two sets of data buffers 404 and 406. In the illustrated embodiment, the agent 400 includes two sets of input data buffers 406 and two sets of output data buffers 404. However, it is to be appreciated that alternate embodiments could include more or fewer data buffers, or that the data buffers could be used for both input and output rather than having two different sets.

The data buffers 404 temporarily store data that is being transferred from the agent 400 to another agent via the bus 101. According to one embodiment of the present invention, each of the data buffers 404 comprises four separate buffers 404a, 404b, 404c, and 404d, each capable of storing 64 bits of data. Each of the data buffers 404 is input to a multiplexer 403. The multiplexer 403 is controlled by the bus controller 138, thereby allowing the bus controller 138 to control which 64-bit portion of data can be provided to the data lines D[63:32]# 418 and D[31:0]# 419 at any particular time.

The output of the multiplexer 403 is then input to a second multiplexer 405, which is also controlled by the bus controller 138. The multiplexer 405 takes the 64 bits of data from the multiplexer 403 and places either the upper 32 bits or the lower 32 bits onto the data lines D[31:0]# 419. Which group of 32 bits is placed on the data lines D[31:0]# 419 is dependent on the control signals received from the bus controller 138, which are dependent on the data transfer width for the transaction, as discussed in more detail below. Additionally, the upper 32 bits from the multiplexer 403 are also placed onto the data lines D[63:32]# 418, thereby making the upper 32 bits available on the data bus for 64-bit wide data transfers.

The data buffers 406 temporarily store data that is being transferred from another agent to the agent 400 via the bus 101. According to one embodiment of the present invention, each of the data buffers 406 comprise four separate buffers each capable of storing 64 bits of data. The buffers 406 and multiplexer 408 are essentially the same as buffers 404 and multiplexers 403 and 405, except that they work in the opposite direction (that is, they operate to store data from the bus rather than transfer data to the bus). Data is received from the D[31:0]# lines 419 and possibly the D[63:32]# lines 418 and placed into one of the data buffers 406 via the multiplexer 408. The multiplexer 408 provides either 64 bits of data to a buffer 406 or 32 bits of data as the upper or lower 32 bits to a buffer 406, based on control signals from the bus controller 138, which are dependent on the data transfer width for the transaction as discussed in more detail below. Thus, it is to be appreciated that the buffer 406 is addressable in 32-bit chunks.

When the agent 400 is issuing a request on the bus, the agent 400 provides an indication of the data transfer widths supported by the agent 400. In one embodiment, this indication is encoded in the REQ[4:0]# signals 414, using the REQ[4:3]# signals asserted in the second clock cycle of the Request Phase. The encoding of the particular data transfer widths supported in this implementation is shown in Table II below.

TABLE II

| REQb[4:3]# | Description |
| --- | --- |
| 00 | Supports 64-bit data transfers only. |
| 01 | Supports either 128-bit or 64-bit data transfers. |
| 10 | Supports either 64-bit or 32-bit data transfers. |
| 11 | Supports 32-bit data transfers only. |

The proper indication to be provided by the agent 400 is based on the data width indicator 401. In one implementation, the data width indictor 401 stores one of the four encodings shown in Table II, and can thus be placed directly on the bus by the bus controller 138.

If the agent 400 is the target of a request issued by another agent coupled to the bus, then the agent 400 also provides, as a target agent, an indication of the data transfer widths supported by the agent 400. In one embodiment, this indication is provided using a combination of one or more of the DRDY# signal 426, DRDYS# signal 428, TRDY# signal 420, and TRDYS# signal 422. A summary of the indications provided by these signals, based on what the requesting agent has indicated it supports, is shown in Table III below.

TABLE III

| Data Transfer Widths Supported By Requesting Agent | Type of Request | Signals Provided By Targeted Agent |
| --- | --- | --- |
| 32-bit only | Any | DRDYS# and TRDYS#. DRDY# and TRDY# are not used. |
| 64-bit only | Any | DRDY# and TRDY# used. DRDYS# and TRDYS# are not used. |
| 32- or 64-bit | Read | DRDYS# asserted to indicate 32-bit data transfer, DRDY# asserted to indicate 64-bit data transfer. TRDY# and TRDYS# not asserted by targeted agent. |
| 32- or 64-bit | Write | TRDYS# asserted to indicate 32-bit data transfer, TRDY# and TRDYS# both asserted to indicate 64-bit data transfer. DRDY# and DRDYS# not asserted by targeted agent. |
| 64- or 128-bit | Read | DRDY# asserted to indicate 64-bit data transfer, DRDY# and DRDYS# both asserted to indicate 128-bit data transfer. TRDY# and TRDYS# not asserted by targeted agent. |
| 64- or 128-bit | Write | TRDY# asserted to indicate 64-bit data transfer, TRDY# and TRDYS# both asserted to indicate 128-bit data transfer. DRDY# and DRDYS# not asserted by targeted agent. |

The proper indication to be provided by the agent 400 is based on the data width indicator 401. The bus controller 138 accesses the data width indicator 401 to identify the data transfer widths supported by the agent 400, and is then able to provide an indication on the bus of which data transfer widths are supported by the agent 400.

It should be noted that in embodiments of the present invention in which different agents can support up to 32, 64, or 128-bit transfers and which use the signals as discussed above in Table III, the agents participating in the transaction maintain a record in the bus controller 138 of whether the data transfer widths indicated as being supported by the requesting agent were 32- or 64-bit, or 64-or 128-bit. This record is kept to allow TRDY# and TRDYS# both being asserted to indicate either a 64-bit or 128-bit data transfer, depending on the original request. It is to be appreciated, however, that the present invention could be implemented using different signal combinations which would not require maintaining such a record.

If the agent 400 snoops a request on the bus which hits a modified cache line in the agent's cache, then the agent 400, which will be placing writeback data on the bus, indicates the data transfer widths supported by the agent 400. In one embodiment, this indication is provided using one or more of the DRDY# signal 426 and DRDYS# signal 428. The TRDY# signal 420 and TRDYS# signal 422 are asserted by the targeted agent, as discussed above. A summary of the indications provided by these signals, based on the data transfer widths both the requesting agent and the targeted agent have indicated they support, is shown in Table IV below.

TABLE IV

| Data Transfer Width Supported By Requesting Agent | Data Transfer Width Supported By Targeted Agent | Request Type | Signals Provided by Snooping Agent |
| --- | --- | --- | --- |
| 32-bit only | Any | Any | DRDYS#. DRDY# not used. |
| 4-bit only | Any | Any | DRDY# used. DRDYS# not used. |
| 32-bit or 64-bit data transfers | 32-bit only | Any | DRDYS# used. DRDY# not used. |
| 32-bit or 64-bit data transfers | 32-bit or 64-bit data transfers | Any | DRDYS# asserted to indicate 32-bit writeback data transfer, DRDY# asserted to indicate 64-bit writeback data transfer. |
| 64-bit or 128-bit data transfers | 64-bit only | Any | DRDY# used. DRDYS# not used. |
| 64-bit or 128-bit data transfers | 64-bit or 128-bit data transfers | Any | DRDY# asserted to indicate 64-bit writeback data transfer, DRDY# and DRDYS# both asserted to indicate 128-bit writeback data transfer. |

The proper indication to be provided by the agent 400 is based on the data width indicator 401. The bus controller 138 accesses the data width indicator 401 to identify the data transfer widths supported by the agent 400 and is then able to provide an indication on the bus of which data transfer widths are supported by the agent 400.

FIGS. 5–8 are timing diagrams illustrating the timing of signals used for dynamically changing the data transfer width of transactions according to one embodiment of the present invention. In the illustrated embodiment, the bus is a latched bus, where signals are sampled by agents on the bus in the clock cycle after the clock cycle in which the signals were driven. However, it is to be appreciated that alternate embodiments could use a non-latched bus.

Figure 5:
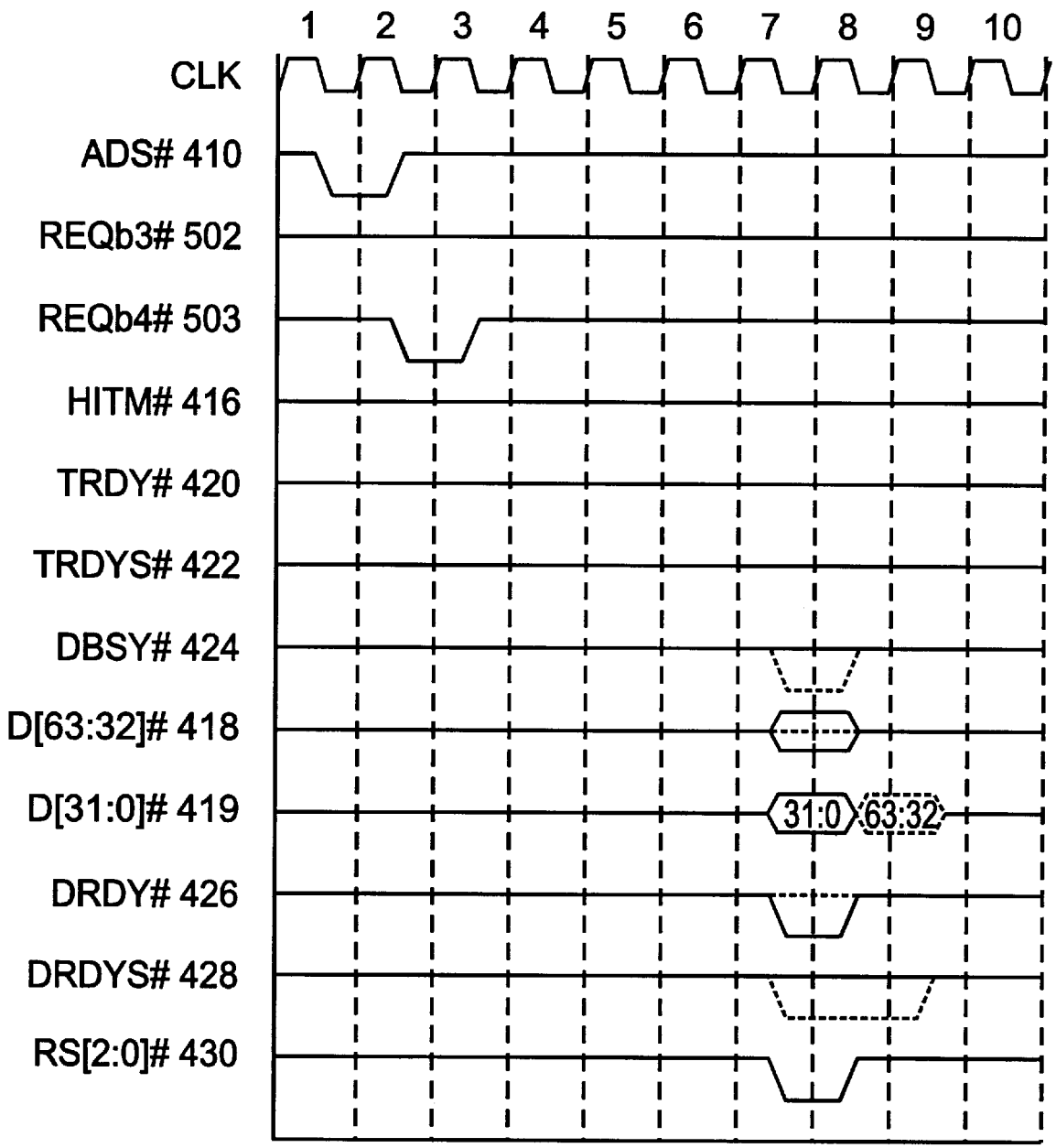
FIG. 5 is a timing diagram illustrating an example of the timing of signals in performing a read transaction according to one embodiment of the present invention.

FIG. 5 is a timing diagram illustrating an example of the timing of signals in performing a read transaction according to one embodiment of the present invention. In the example of FIG. 5, the requesting agent places a read request for eight bytes of data on the bus. As illustrated in FIG. 5, the requesting agent asserts the ADS# signal 410 in CLK 1, which is sampled in CLK 2 by the other agents on the bus, to indicate that the request is beginning. The REQb4# signal 503 is asserted and the REQb3# signal 502 is deasserted in CLK 2 by the requesting agent to indicate that the requesting agent can support either 64-bit or 32-bit data transfer widths.

In the example of FIG. 5, the request does not hit a modified cache line in any other agent on the bus, so no other agent asserts the HITM# signal 416. Additionally, because the request is a read request, the requesting agent is presumed to have sufficient buffer space for the requested data, therefore the TRDY# and TRDYS# signals 420 and 422 are not used for the read transaction. The targeted agent asserts the response signals RS[2:0]# 430 in CLK 7, providing the completion information to the requesting agent (e.g., a normal response), which are sampled by the requesting agent in CLK 8.

If the targeted agent is going to provide the requested data as a 64-bit wide data transfer, then the targeted agent places the requested eight bytes of data on the D[63:32]# data lines 418 and D[31:0]# data lines 419 in CLK 7. The DBSY# signal 424 is not asserted because the data transfer is only one clock cycle. The targeted agent asserts the DRDY# signal 426 in CLK 7 and deasserts the DRDYS# signal 428 in CLK 7, thereby indicating to the requesting agent that the requested data will be provided as a 64-bit wide data transfer.

However, if the targeted agent is going to provide the requested data as a 32-bit wide data transfer, then the targeted agent breaks the requested eight bytes of data into two portions. The differences in signals between the 64-bit wide data transfer and the 32-bit wide data transfer are shown as dashed lines. The targeted agent places one portion, 32 bits, of the data on the D[31:0]# data lines 419 in CLK 7 and the second portion on the D[31:0]# data lines 419 in CLK 8, which are received by the requesting agent in CLK 8 and CLK 9, respectively. Because the data transfer is two clocks long, the targeted agent asserts the DBSY# signal 424 for one clock cycle in CLK 7. As illustrated, the D[63:32]# lines 418 are not used in the 32-bit wide data transfer. Additionally, the DRDY# signal 426 is deasserted in CLK 7, and the DRDYS# signal 428 is asserted in CLK 7 and CLK 8. Thus, the 32-bit wide data transfer uses an additional clock cycle to transfer all 64 bits of the data over the D[31:0]# data lines 419.

Figure 6:
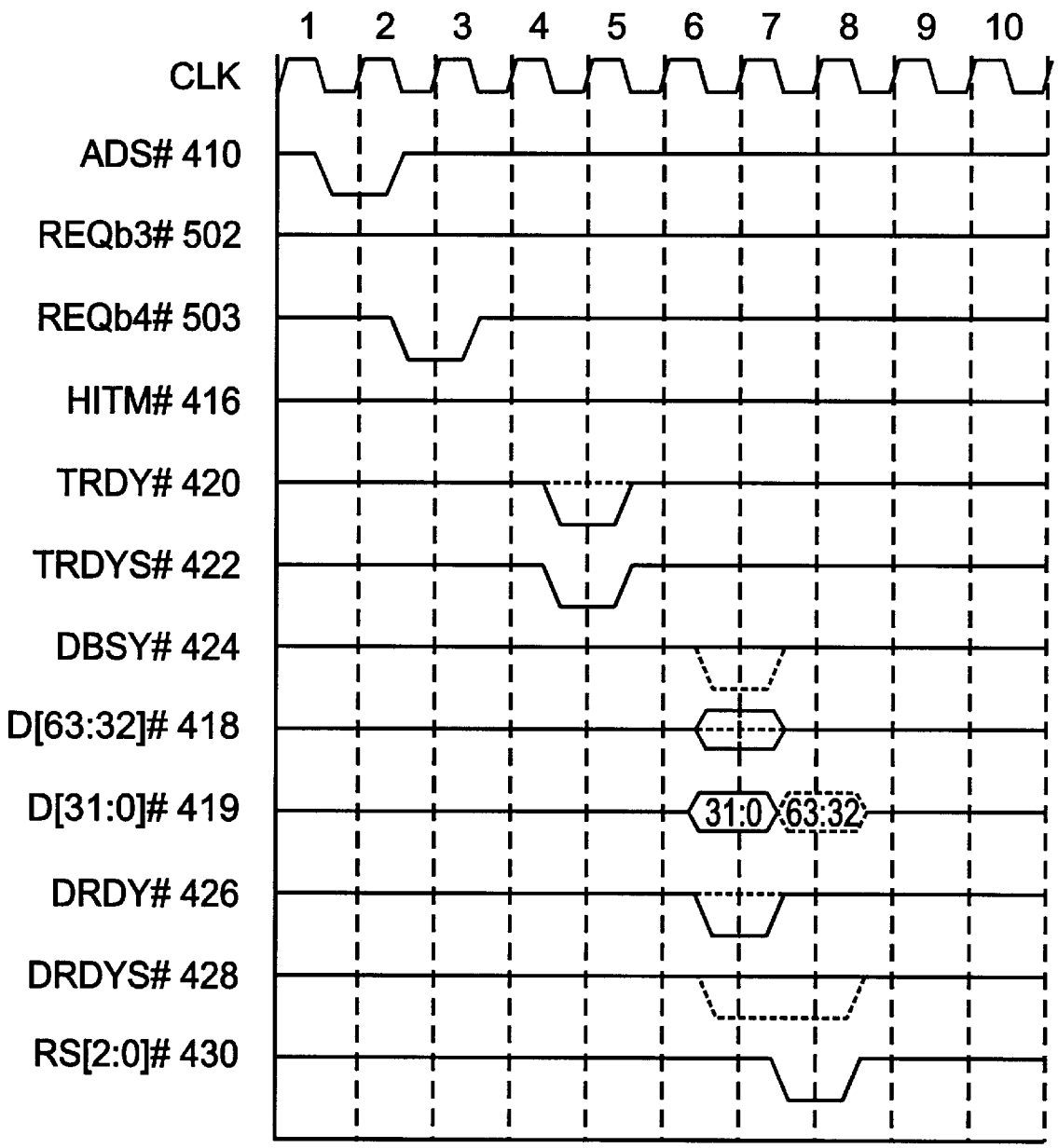
FIG. 6 is a timing diagram illustrating an example of the timing of signals in performing a write transaction according to one embodiment of the present invention.

FIG. 6 is a timing diagram illustrating an example of the timing of signals in performing a write transaction according to one embodiment of the present invention. In the example of FIG. 6, the requesting agent places a write request having eight bytes of data on the bus. As illustrated in FIG. 6, the requesting agent asserts the ADS# signal 410 in CLK 1, which is sampled in CLK 2 by the other agents on the bus, to indicate that the request is beginning. The REQb4# signal 503 is asserted and the REQb3# signal 502 is deasserted in CLK 2 by the requesting agent to indicate that the requesting agent can support either 64-bit or 32-bit data transfer widths.

If the targeted agent is going to accept the write data as a 64-bit wide data transfer, then the targeted agent asserts both the TRDY# and TRDYS# signals 420 and 422 in CLK 4. In response to sampling the TRDY# and TRDYS# signals 420 and 422 asserted, he requesting agent places all eight bytes of data on the D[63:32]# data lines 418 and D[31:0]# data lines 419 in CLK 6. The requesting agent also asserts the DRDY# signal 426 in CLK 6 to indicate that valid data is on the bus. It should be noted that the DRDYS# signal 428 is not used in the 64-bit wide data transfer as illustrated.

However, if the targeted agent is going to accept the write data as a 32-bit wide data transfer, then the requesting agent breaks the eight bytes of write data into two portions. The differences in signals between the 64-bit wide data transfer and the 32-bit wide data transfer are shown as dashed lines. The targeted agent indicates a 32-bit data transfer by asserting the TRDYS# signal 422 and deasserting the TRDY# signal 420 in CLK 4. In response to the TRDY# signal 420 deasserted and the TRDYS# signal 422 asserted, the requesting agent places one portion, 32 bits, of the data on the data lines D[31:0]# data lines 419 in CLK 6 and the second portion on the D[31:0]# data lines 418 in CLK 7, which are received by the requesting agent in CLK 7 and CLK 8, respectively. Because the data transfer is two clocks long, the targeted agent asserts the DBSY# signal 424 for one clock cycle in CLK 6. As illustrated, the D[63:32]# lines 418 are not used in the 32-bit wide data transfer. Additionally, the DRDY# signal 426 remains deasserted in CLK 6, and the DRDYS# signal 428 is asserted in CLK 6 and CLK 7. Thus, the 32-bit wide data transfer uses an additional clock cycle to transfer all 64 bits of the data over the D[31:0]# data lines 419, all as part of the same transaction.

In the example of FIG. 6, the request does not hit a modified cache line in any other agent on the bus, so no other agent asserts the HITM# signal 416. The targeted agent asserts the response signals RS[2:0]# 430 in CLK 7, providing the completion information to the requesting agent (e.g., a normal response), which are sampled by the requesting agent in CLK 8.

Figure 7:
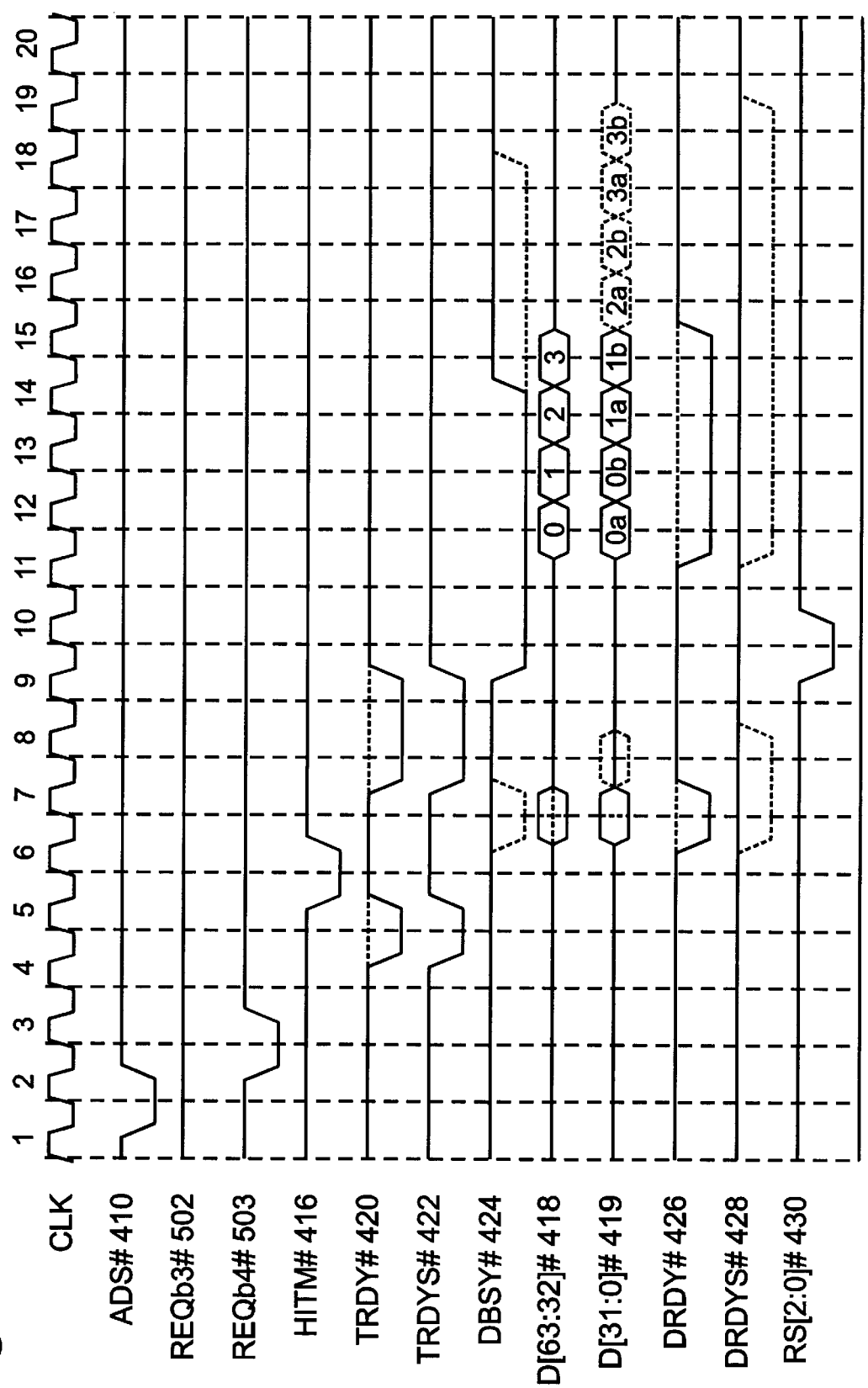
FIG. 7 is a timing diagram illustrating an example of the timing of signals in performing a write transaction with an implicit writeback according to one embodiment of the present invention.

FIG. 7 is a timing diagram illustrating an example of the timing of signals in performing a write transaction with an implicit writeback according to one embodiment of the present invention. As illustrated in FIG. 7, the requesting agent asserts the ADS# signal 410, which is sampled in CLK 2 by the other agents on the bus, to indicate that the request is beginning. The REQb4# signal 503 is asserted and the REQb3# signal 502 is deasserted in CLK 2 by the requesting agent to indicate that the requesting agent can support either 64-bit or 32-bit data transfer widths.

In the example of FIG. 7, the request hits a modified cache line in another agent on the bus, referred to as the snooping agent, which asserts the HITM# signal 416 in CLK 5. The targeted agent asserts the response signals RS[2:0]# 430 in CLK 9, providing the completion information to the requesting agent (e.g., an implicit writeback response), which are sampled by the requesting agent in CLK 10.

The target agent asserts the TRDY# signal 420 and TRDYS# signal 422 in CLK 4 to indicate that it is ready to accept data and that it can accept either 32-bit wide or 64-bit wide data. Note that the TRDYS# signal 422 would be asserted and the TRDY# signal 420 deasserted in CLK 4 if the target agent could only accept 32-bit wide data. In CLK 5, the requesting agent observes the TRDY# and TRDYS# signals 420 and 422 active and the DBSY# signal 424 inactive, so the requesting agent can begin the transfer of the write data. If the requesting agent is going to transfer the write data as a 64-bit wide data transfer, then the requesting agent asserts the DRDY# signal 426 in CLK 6 and drives the data on the D[63:32]# data lines 418 and D[31:0]# data lines 419.

However, if the requesting agent is going to transfer the write data as a 32-bit wide data transfer, then the requesting agent asserts the DBSY# signal 424 in CLK 6 for one clock cycle, asserts the DRDYS# signal 428 in CLK 6 for two clock cycles, and does not assert the DRDY# signal 426. Additionally, the write data is separated into two 32-bit portions and each of the portions is placed on the D[31:0]# data lines 419, one portion in CLK 6 and the second portion in CLK 7. The differences in signals between the 64-bit wide data transfer and the 32-bit wide data transfer are shown as dashed lines.

After the write data has been transferred, the snooping agent writes back the cache line which includes the write data so that the targeted agent (e.g., a memory controller) can merge the write data and the writeback cache line together. Assuming the write data transfer was a 64-bit wide data transfer, the target agent asserts the TRDY# signal 420 and TRDYS# signal 422 in CLK 7 to indicate that it is ready to accept the writeback data and that it can accept either 32-bit wide or 64-bit wide data. The snooping agent asserts the DBSY# signal 424 in CLK 9 to indicate that the data bus D[31:0]# 419 and possibly D[63:32]# 418 is about to become busy. If the snooping agent is going to transfer the writeback data as a 64-bit wide data transfer, then the snooping agent asserts the DRDY# signal 426 in CLK 11 and places the first 8-byte portion of the data on the D[31:0]# data lines 419 and D[63:32]# data lines 418 in CLK 11. In the illustrated embodiment, a cache line (and thus the writeback data) is 32 bytes, so one 8-byte portion of data is asserted on the D[31:0]# data lines 419 and D[63:32]# data lines 418 in each of CLK 11, CLK 12, CLK 13, and CLK 14, illustrated as 0, 1, 2, and 3.

However, if the snooping agent is going to transfer the writeback data as a 32-bit wide data transfer, then the snooping agent asserts the DRDYS# signal 428 in CLK 11 and does not assert the DRDY# signal 428 in CLK 11. In the illustrated embodiment, the writeback data is 32 bytes, so eight 32-bit portions of data are driven on the D[31:0]# data lines 419, one each in CLK 11 through CLK 18. The first 8-byte portion is illustrated as 0a and 0b, asserted on the D[31:0]# data lines 419 in CLK 11 and CLK 12. The remaining three 8-byte portions are illustrated as 1a, 1b, 2a, 2b, 3a, and 3b. The differences in signals between the 64-bit wide data transfer and the 32-bit wide data transfer are shown as dashed lines.

It should be noted that, as illustrated in FIG. 7, different data transfer widths can be supported within the same transaction. For example, the transfer of the write data from the requesting agent to the target agent could be a 64-bit wide data transfer, whereas the transfer of the writeback data from the snooping agent to the target agent could be a 32-bit wide data transfer.

Figure 8:
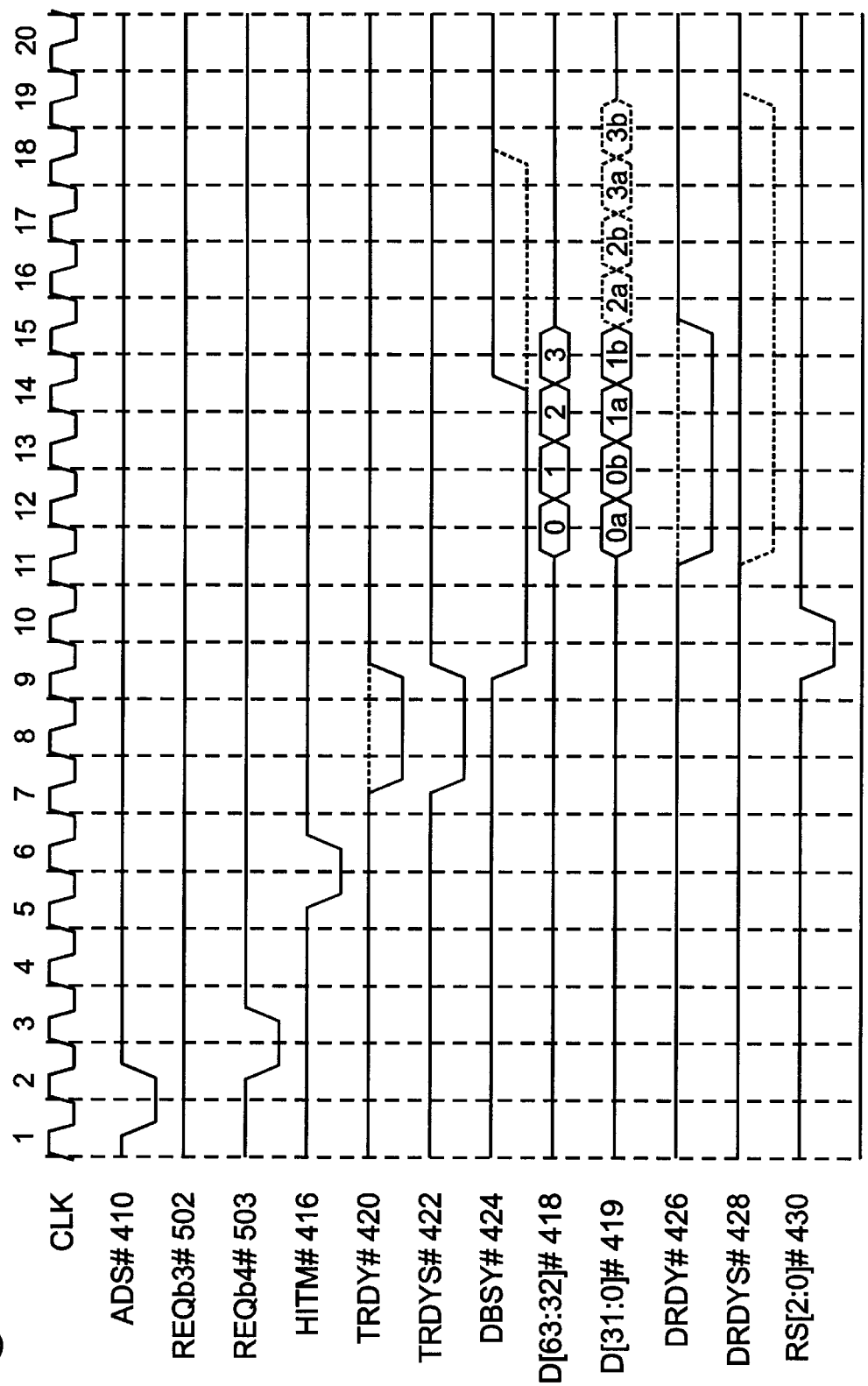
FIG. 8 is a timing diagram illustrating an example of the timing of signals in performing a read transaction with an implicit writeback according to one embodiment of the present invention.

FIG. 8 is a timing diagram illustrating an example of the timing of signals in performing a read transaction with an implicit writeback according to one embodiment of the present invention. As illustrated in FIG. 8, the requesting agent asserts the ADS# signal 410, which is sampled in CLK 2 by the other agents on the bus, to indicate that the request is beginning. The REQb4# signal 503 is asserted and the REQb3# signal 502 is deasserted in CLK 2 by the requesting agent to indicate that the requesting agent can support either 64-bit or 32-bit data transfer widths.

In the example of FIG. 8, the request hits a modified cache line in another agent on the bus, referred to as the snooping agent, which asserts the HITM# signal 416 in CLK 5. The targeted agent asserts the response signals RS[2:0]# 430 in CLK 9, providing the completion information to the requesting agent (e.g., an implicit writeback response), which are sampled by the requesting agent in CLK 10.

The snooping agent becomes the source of the requested data and writes back the cache line which includes the requested data. The target agent asserts the TRDY# signal 420 and TRDYS# signal 422 in CLK 7 to indicate that it is ready to accept the writeback data and that it can accept either 32-bit wide or 64-bit wide data. Alternatively, the target agent would assert the TRDYS# signal 422 and deassert the TRDY# signal 420 in CLK 7 if the target agent could accept only 32-bit wide data. The snooping agent asserts the DBSY# signal 424 in CLK 9 to indicate that the data bus D[31:0]# 419 and possibly D[63:32]# 418 is about to become busy. If the snooping agent is going to transfer the writeback data as a 64-bit wide data transfer, then the snooping agent asserts the DRDY# signal 426 in CLK 11 and places the first 8-byte portion of the data on the D[31:0]# data lines 419 and D[63:32]# data lines 418 in CLK 11. In the illustrated embodiment, a cache line (and thus the writeback data) is 32 bytes, so one 8-byte portion of data is asserted on the D[31:0]# data lines 419 and D[63:32]# data lines 418 in each of CLK 11, CLK 12, CLK 13, and CLK 14, illustrated as 0, 1, 2, and 3.

However, if the snooping agent is going to transfer the writeback data as a 32-bit wide data transfer, then the snooping agent asserts the DRDYS# signal 428 in CLK 11 and does not assert the DRDY# signal 428 in CLX 11. In the illustrated embodiment, the writeback data is 32 bytes, so eight 32-bit portions of data are driven on the D[31:0]# data lines 419, one each in CLK 11 through CLK 18. The first 8-byte portion is illustrated as 0a and 0b, asserted on the D[31:0]# data lines 419 in CLK 11 and CLK 12. The remaining three 8-byte portions are illustrated as 1a, 1b, 2a, 2b, 3a, and 3b. The differences in signals between the 64-bit wide data transfer and the 32-bit wide data transfer are shown as dashed lines.

The present invention has been described above with reference to particular data transfer widths. It is to be appreciated that these particular data transfer widths are examples only, and that the present invention may be used with any of a wide range of data bus widths and supported data transfer widths.

The present invention has also been described as supporting two different data transfer widths (for example, 32-bit and 64-bit data transfers, or 64-bit and 128-bit data transfers). It is to be appreciated however, that more than two different data transfer widths could be supported within the spirit and scope of the present invention.

As discussed above, any of the agents which are part of the transaction can limit the data transfer widths in the transaction. In alternate embodiments, as soon as an agent limits the size of a transaction, all agents participating in the transaction presume this data transfer size when issuing subsequent signals. For example, if a first agent has limited a transaction to be a 32-bit wide data transfer, then all agents involved in the transaction issue subsequent signals presuming a 32-bit wide data transfer, regardless of whether they can support a larger data transfer width.

It is to be appreciated that all agents coupled to a bus need not support all of the above control signals. For example, an agent which only supports 32-bit data transfer widths would use the DRDYS# and TRDYS# signals, and would not require the pins for the DRDY# and TRDY# signals.

In the discussions above, a protocol for supporting changing data transfer widths in a computer system is described. As discussed, this protocol is implemented using different signal combinations. In one implementation, no error-checking is performed during operation of the system to verify that this protocol is being followed. However, it is to be appreciated that in alternate implementations additional error-checking could be performed to identify whether the protocol is being violated.

Also in the discussions above, when a data transfer of more than 32 bits is to be transferred as a 32-bit data transfer, the agent which provides the data on the bus is described as being responsible for placing each portion of the data on the lower 32 bits of the bus. However, it is to be appreciated that in alternate embodiments this could be accomplished at the receiving agent, such as by providing support on a printed circuit board at the receiving agent to accept data from the upper bits of the bus and provide it to the 32 data pins for the receiving agent.

Also in the discussions above, the data transfer width supported by the requesting agent is described as being encoded on two bits. It is to be appreciated that more or fewer bits could be used to encode the data transfer widths supported. It is also to be appreciated that the multiple-bit encoding could be transferred on the same signal line over multiple clock cycles.

Thus, the present invention provides a method and apparatus for providing changing data transfer widths in a computer system. The width of a data transfer is determined on a transaction by transaction basis, based on the different data transfer widths supported by each agent involved in the particular transaction. Any agent participating in the transaction can limit the width of the data transfer, whereas other agents coupled to the bus which are not participating in the transaction do not affect the data transfer width for the transaction.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

Thus, a method and apparatus for changing data transfer widths in a computer system has been described.

What is claimed is:

1. In a computer system, a method for determining a width of a data transfer between a first agent on a bus and a second agent on the bus, the method comprising:
   (a) providing a first indication from the first agent to the second agent identifying one or more data transfer widths supported by the first agent;
   (b) providing a second indication from the second agent to the first agent identifying one or more data transfer widths supported by the second agent;
   (c) determining, at each of the first agent and the second agent, the width of the data transfer based, at least in part, on at least one of the first indication and the second indications; and
   (d) placing at least an initial subset of data on the bus at the transfer data width negotiated between the first agent and the second agent.

2. The method of claim 1, wherein step (c) comprises the step of selecting a largest data width supported by both the first agent and the second agent.

3. The method of claim 1, wherein step (a) comprises the step of asserting one or more control signals on the bus as the first indication.

4. The method of claim 3, wherein step (b) comprises the step of asserting one or more control signals on the bus as the second indication in response to receiving a request for the data transfer from the first agent.

5. The method of claim 1, further comprising the step of providing a third indication from a third agent on the bus identifying one or more data transfer widths supported by the third agent.

6. The method of claim 5, wherein step (c) comprises the step of selecting a largest data width supported by each of the first agent, the second agent, and the third agent.

7. In a computer system, a method for selecting a width of a data transfer between two or more agents coupled to a bus, the method comprising:
- (a) placing a request on the bus by a first agent of the two or more agents as part of a transaction;
- (b) receiving an indication of one or more data transfer widths supported by a second agent of the two or more agents from the second agent;
- (c) selecting a data transfer width at the first and the second agents based, at least in part, on the first and second indications; and
- (d) placing at least a subset of data on the bus, corresponding to the request, as part of the transaction in accordance with the selected data transfer width negotiated by at least the first agent and the second agent.

8. The method of claim 7, wherein the indication of one or more data transfer widths supported by the second agent comprises a maximum data transfer width supported by the second agent.

9. The method of claim 7, further comprising placing an indication on the bus as part of the request identifying one or more data transfer widths supported by the first agent.

10. An apparatus comprising:
- an indicator to provide an indication of one or more data transfer widths supported by the apparatus; and
- a bus interface, coupled to the indicator, to identify the one or more data transfer widths supported by the apparatus based on the indicator, to receive an indication of one or more data transfer widths supported by a first agent coupled to the apparatus through a bus, wherein the apparatus places at least a subset of the data on the bus through the bus interface in accordance with a select data transfer width negotiated between the apparatus and the first agent.

11. The apparatus of claim 10, wherein the bus interface is further configured to identify the one or more data transfer widths supported by the first agent as part of a bus transaction, and to place the data on the bus as part of the bus transaction.

12. The apparatus of claim 10, wherein the bus interface is further configured to receive an indication of one or more data transfer widths supported by a second agent coupled to the bus, and to place data on the bus in accordance with the one or more data transfer widths supported by the apparatus, the one or more data transfer widths supported by the first agent, and the one or more data transfer widths supported by the second agent.

13. A computer system comprising:
- a bus; and
- a plurality of agents coupled to the bus, wherein each of the plurality of agents includes an indicator of one or more data transfer widths supported by the agent, wherein each of the plurality of agents party to a bus transaction provides an indication of at least one of the one or more data transfer widths supported by the agent, wherein each of the plurality of agents participates in the selection of a data transfer width from the one or more data transfer widths supported by each of the plurality of agents party to the bus transaction based, at least in part, on at least one of the indications provided by the plurality of agents prior to data transmission.

14. The computer system of claim 13, wherein each of the plurality of agents is further configured to place data requested as part of a bus transaction by another agent of the plurality of agents onto the bus in accordance with the data transfer widths indicated by each agent which is a party to the bus transaction.

* * * * *

UNITED STATES PATENT AND TRADEMARK OFFICE
CERTIFICATE OF CORRECTION

PATENT NO.  : 5,911,053
DATED       : June 8, 1999
INVENTOR(S) : Pawlowski

It is certified that error appears in the above-identified patent and that said Letters Patent is hereby corrected as shown below:

Column 1,
Line 34, insert -- a --.

Column 12,
Line 62, delete "he" and insert -- the --.

Column 15,
Line 20, delete "CLX" and insert -- CLK --.

Column 16,
Line 47, delete "indications" and insert -- indication --.

Signed and Sealed this

Second Day of December, 2003

JAMES E. ROGAN
*Director of the United States Patent and Trademark Office*